July 21, 1925.

O. B. MOORHEAD

PHOTO ELECTRIC SYSTEM

Filed March 10, 1919

1,546,504

WITNESS
J. H. Morgan

INVENTOR
O. B. Moorhead.
BY White & Prost
His ATTORNEYS

Patented July 21, 1925.

1,546,504

UNITED STATES PATENT OFFICE.

OTIS B. MOORHEAD, OF SAN FRANCISCO, CALIFORNIA.

PHOTO-ELECTRIC SYSTEM.

Application filed March 10, 1919. Serial No. 281,884.

*To all whom it may concern:*

Be it known that I, OTIS B. MOORHEAD, a citizen of the United States, and a resident of the city and county of San Francisco, State of California, have invented a certain new and useful Photo-Electric System, of which the following is a specification.

The invention relates to a system for utilizing the photo-electric properties of selenium.

One of the objects of the invention is to provide a system for increasing the sensitivity of the selenium cell.

The invention possesses other advantageous features, some of which, with the foregoing, will be set forth at length in the following description, where I shall outline in full, that form of the invention which I have selected for illustration in the drawings accompanying and forming part of the present specification. In said drawings, I have shown one form of system of my invention, but it is to be understood that I do not limit myself to such form, since the invention, as expressed in the claim, may be embodied in a plurality of forms.

Referring to said drawings.

My invention may be explained in connection with the production of a photographic record of the sound and the subsequent reproduction of the sound. The sound is recorded on a moving photographic film by means of a flaming arc or other bright, rapidly variable source of light, the intensity of illumination of which is varied in accordance with variations in the sound. A positive print of the negative film is then prepared on translucent material, preferably photographic film, and the positive print is then moved between a source of light and a selenium cell. Illumination of varying intensity is thereby thrown on the cell which is arranged in a circuit, so that the varying resistance of the cell will reproduce the recorded sound. The selenium cell circuit is adjusted to render the cell very sensitive to light variations and the recorded sound is consequently efficiently and faithfully reproduced.

Figure 3:
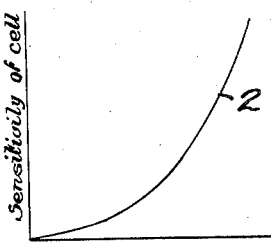
Figure 3 is a sensitivity curve of a selenium cell.

I have found that the sensitivity of a selenium cell, that is, its ratio of change of resistance to change of intensity of illumination, varies with the voltage impressed on the cell. The sensitivity curve of a selenium cell is substantially as shown in Figure 3, the curve starting rather flat and gradually becoming more steep, as the voltage is increased. In accordance with my invention, I impress a voltage on the cell, which brings its sensitivity up onto the steep part of the curve, for instance to the point 2, and consequently, small variations in illumination produce relatively large changes in resistance. This renders the reproducing apparatus extremely sensitive.

Figure 1:
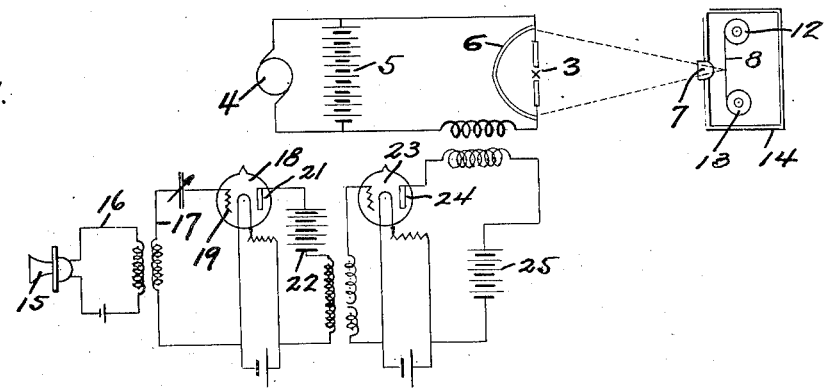
Figure 1 is a diagram showing how sound may be recorded by the aid of light variations upon a film, and useful in explaining the purpose of my invention.
Figure 2:
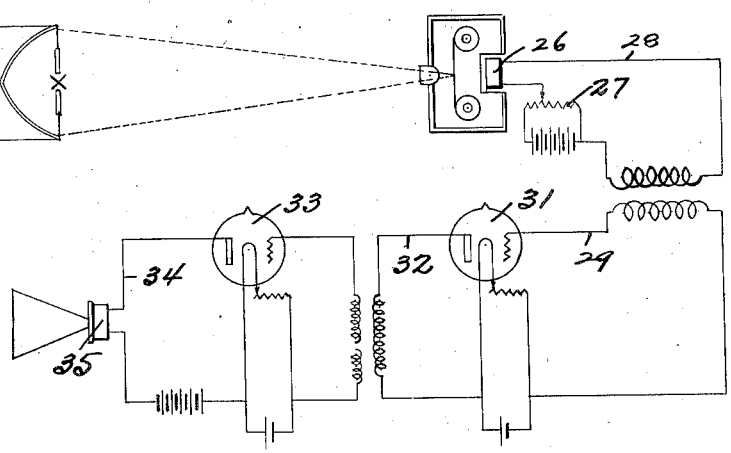
Figure 2 is a diagrammatic representation of a reproducing system utilizing my invention.

The recording apparatus of Fig. 1 comprises a source of illumination, such as a flaming arc 3, which is fed with a uniform, continuous current from the generator 4 and the storage battery 5. Behind the flaming arc 3 is a reflector 6, for concentrating the illumination on the lens 7, which brings it to a focus on the moving strip of film 8, moving from reel 12 to reel 13, in the enclosing case 14. The current delivered to the arc lamp is varied in accordance with the sounds to be recorded.

The sound to be recorded is produced or emitted adjacent the microphone transmitter 15 arranged in the circuit 16, thereby producing an undulating current in said circuit. The undulating current in this circuit is amplified and the amplified current is caused to alter the arc current correspondingly, so that the intensity of illumination of the arc is modified by the amplified undulating current. The current is amplified by a relay controlling a separate source of energy, which initiates oscillations corresponding to the potential oscillations impressed on the relay. The relay preferably used for this purpose is an electron discharge tube having an incandescent cathode, an anode and a grid. I prefer to arrange a plurality of relays in cascade between the microphone circuit and the arc circuit, to obtain a large amplification of the undulatory current produced by the sound or voice. The microphone circuit is inductively coupled with the grid circuit 17 of the electron relay 18, thereby varying the potential charges on the grid 19 in accordance with the sound waves. The amplified current circuit which contains the plate 21 and battery 22 is inductively coupled with the grid circuit of the relay tube 23 and the amplified current circuit of the relay 23, which contains the plate 24 and the battery 25 is inductively coupled with the circuit of the arc lamp. When desired, only one relay may be employed, but I have found that the multiple amplification of the current produces better results. The current variations in the circuit of the battery 25 correspond directly to the variations in the microphone circuit and the arc lamp circuit current is correspondingly varied, causing a variation in intensity of illumination of the arc, so that the moving film receives a photographic record of the sound.

The positive film is then produced and is moved between a selenium cell 26 and a source of constant illumination, which is focused on the positive film. As the film moves, the intensity of the illumination falling on the selenium cell varies in accordance with the recorded sound. The selenium cell is arranged in circuit with a potentiometer 27 which is adjusted so that the voltage impressed on the cell brings the sensitivity of the cell up on to the steep part of the sensitivity curve. Small variations in illumination, therefore, produce comparatively larger variations in resistance of the cell, and an undulatory current corresponding to the sound originally produced is produced in the circuit of the cell. This undulatory current is then amplified, one or more times, by electron relays or amplifiers and the amplified current caused to act on a suitable receiver or other device for converting undulatory current into sound waves.

In the present construction, the cell circuit 28 is inductively connected with the grid circuit 29 of the relay 31, producing an amplified current in the plate and battery circuit 32. This current is then further amplified by inductively connecting the circuit 32 with the grid circuit of tube 33, causing an amplified current in the plate and battery circuit 34 in which the receiver 35 or other means of translating undulatory current into sound is arranged.

The recording apparatus may also be used to record radio messages, by omitting the microphone and connecting the antenna receiving circuit directly or inductively to the circuit from which the microphone was removed.

I claim:

In a photo-electric system having a selenium cell and a source of voltage, the method which comprises applying to the cell an electromotive force derived from the source, of such a value as to increase the sensitivity of the cell to a large degree.

In testimony whereof, I have hereunto set my hand at San Francisco, California, this 4th day of March 1919.

OTIS B. MOORHEAD.

In presence of—
 H. G. PROST.